(12) United States Patent
Caretti et al.

(10) Patent No.: US 10,306,661 B2
(45) Date of Patent: May 28, 2019

(54) METHOD AND SYSTEM FOR UPLINK RADIO RESOURCES ALLOCATION

(71) Applicant: TELECOM ITALIA S.p.A., Milan (IT)

(72) Inventors: Marco Caretti, Turin (IT); Paolo Goria, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/526,173

(22) PCT Filed: Nov. 6, 2015

(86) PCT No.: PCT/EP2015/075907
§ 371 (c)(1),
(2) Date: May 11, 2017

(87) PCT Pub. No.: WO2016/075040
PCT Pub. Date: May 19, 2016

(65) Prior Publication Data
US 2017/0318599 A1  Nov. 2, 2017

(30) Foreign Application Priority Data
Nov. 14, 2014 (IT) .............................. MI2014A1970

(51) Int. Cl.
*H04W 72/00* (2009.01)
*H04W 72/12* (2009.01)
(Continued)

(52) U.S. Cl.
CPC ......... *H04W 72/1215* (2013.01); *G01S 19/21* (2013.01); *H04L 5/001* (2013.01);
(Continued)

(58) Field of Classification Search
CPC ............ H04W 72/1215; H04W 76/27; H04W 76/046; H04W 72/0413; H04W 72/0446;
(Continued)

(56) References Cited

U.S. PATENT DOCUMENTS

| 8,526,388 B1* | 9/2013 | Kaukovuori ........ H04W 72/082 370/329 |
| 2010/0035562 A1 | 2/2010 | Alberth, Jr. et al. |

(Continued)

OTHER PUBLICATIONS

International Search Report and Written Opinion dated Feb. 12, 2016 in PCT/EP2015/075907 Filed Nov. 6, 2015.

*Primary Examiner* — Marcos Batista
(74) *Attorney, Agent, or Firm* — Oblon, McClelland, Maier & Neustadt, L.L.P.

(57) ABSTRACT

A method for uplink allocation of radio resources in a cellular network including a network node and, associated therewith, at least one user equipment supporting data reception from a global navigation satellite system. The method includes, for each of the at least one user equipment: if uplink data transmission from the user equipment to the network node is based on aggregation of carriers and if data reception from the global navigation satellite system is enabled, determining a reception time interval, with respect to a framing system of the cellular network, during which data reception from the global navigation satellite system takes place, the determining based on timing information concerning data reception by the user equipment from the global navigation satellite system; if uplink data transmission potentially takes place at least partially within the reception time interval, limiting allocation of radio resources for the uplink data transmission from the user equipment.

15 Claims, 2 Drawing Sheets

Figure 1:
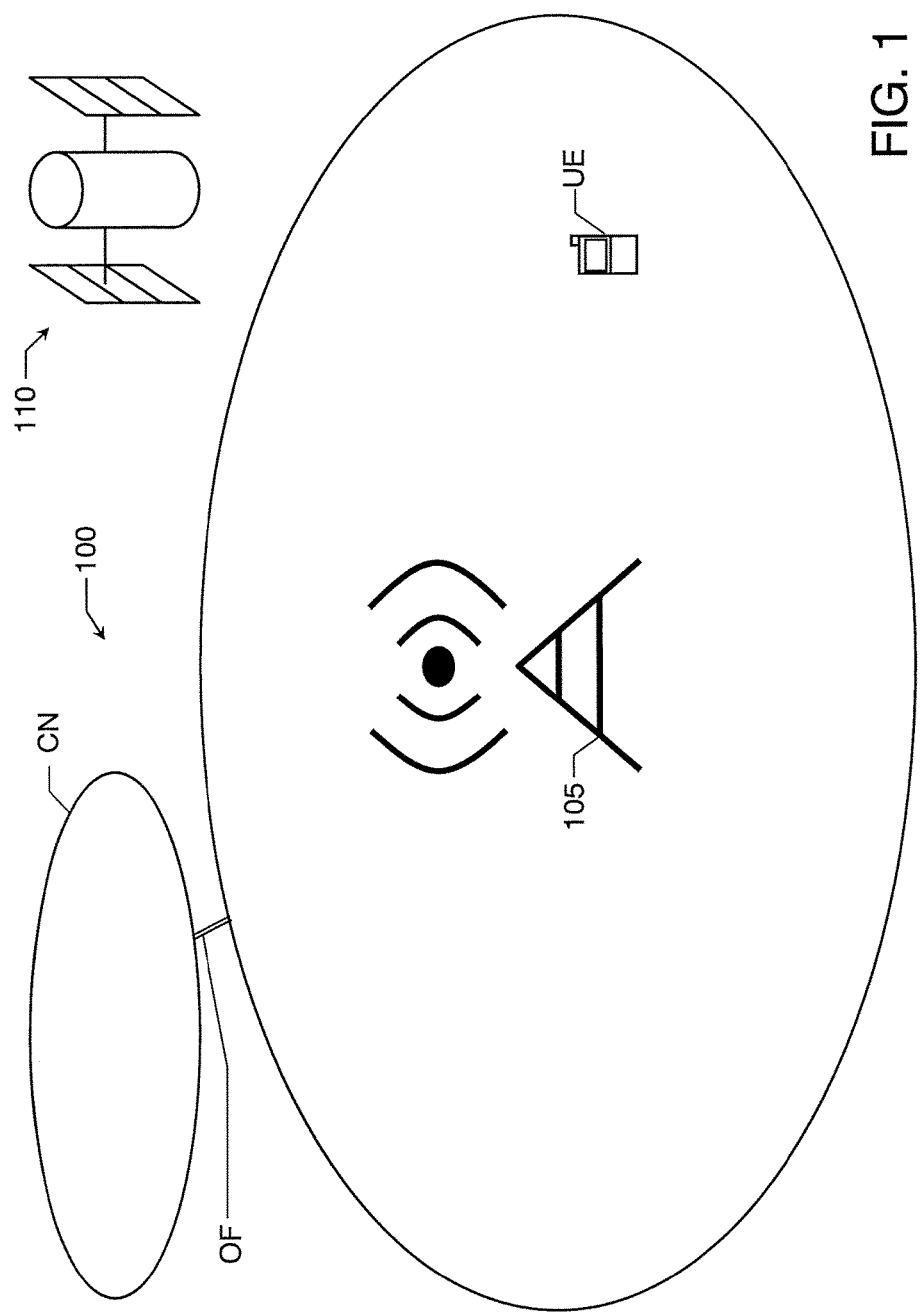

(51) Int. Cl.
   *H04W 76/27*    (2018.01)
   *G01S 19/21*    (2010.01)
   *H04L 5/00*     (2006.01)
   *H04L 27/00*    (2006.01)
   *H04W 72/04*    (2009.01)

(52) U.S. Cl.
   CPC .......... *H04L 5/0062* (2013.01); *H04L 5/0066* (2013.01); *H04L 27/0006* (2013.01); *H04W 72/0413* (2013.01); *H04W 72/0446* (2013.01); *H04W 76/27* (2018.02)

(58) Field of Classification Search
   CPC ... H04L 27/0006; H04L 5/0062; H04L 5/001; H04L 5/0066; G01S 19/21
   USPC .......................................... 455/450; 370/338
   See application file for complete search history.

(56) References Cited

U.S. PATENT DOCUMENTS

| | | |
|---|---|---|
| 2010/0144279 A1 | 6/2010 | Vasenkari et al. |
| 2013/0207839 A1 | 8/2013 | Simic et al. |
| 2013/0250871 A1 | 9/2013 | Kaukovuori et al. |
| 2014/0036882 A1* | 2/2014 | Baghel ................. H04B 1/1027 370/336 |
| 2015/0301187 A1* | 10/2015 | Lee ....................... G01S 19/423 342/357.67 |

* cited by examiner

METHOD AND SYSTEM FOR UPLINK RADIO RESOURCES ALLOCATION

BACKGROUND OF THE INVENTION

Field of the Invention

The present invention generally relates to wireless communication networks, such as radiomobile or cellular networks. More particularly, the present invention relates to protection of "Global Navigation Satellite System" data reception during uplink data transmission based on Carrier Aggregation in a cellular network compliant with LTE/LTE-A technology.

Overview of the Related Art

Cellular networks, such as cellular networks compliant with LTE/LTE-A technology, allow data to be high-speed conveyed between a fixed-location transceiver base station (or network node) and user equipments (e.g., user terminals, such as cellular phones, smartphones, tablets) associated therewith (e.g., within a network cell identified by the network node).

In current LTE/LTE-A specifications Carrier Aggregation functionality has been introduced, which allows concurrent use of several carriers (usually referred to as aggregated or component carriers) at respective frequencies to provide an aggregated bandwidth (e.g., up to 100 MHz) in order to meet "International Mobile Telecommunications-Advanced" (IMT-Advanced) requirements for high data rates.

A very common type of user equipment presently available on the market also embeds a "Global Navigation Satellite System" receiver (hereinafter, GNSS receiver) for receiving signals (hereinafter, GNSS signals) that comprise data (hereinafter, GNSS data) providing accurate current position of the user equipment, when required.

However, degradation in reception of the GNSS signals may be experienced when uplink data transmission based on Carrier Aggregation (hereinafter, Carrier Aggregation uplink data transmission) takes place and when GNSS signals reception is enabled. Indeed, due to non-linear signal processing, when two (or more) signals are transmitted on different frequencies (such as in Carrier Aggregation uplink data transmission), undesired "InterModulation Distortion" (IMD) signals result in portions of the spectrum. These IMD signals comprise signals at harmonic frequencies (i.e., at integer multiples) of the carriers frequencies, as well as signals at the sum and difference frequencies of the carriers frequencies and at harmonic frequencies thereof.

Thus, when IMD signals fall within the GNSS receiver band, degradation in reception of the GNSS signals may be experienced.

Paper R4-145947, "How to handle IMD interference for GNSS". NTT DOCOMO, INC., Jun. 10, 2014, 3GPP TSG-RAN WG4 Meeting #72bis generically discloses the issue that the IMD signals could interfere with the GNSS receiver in a user equipment supporting LTE/LTE-A technology and Carrier Aggregation functionality, as well as the possibility to avoid this issue by introducing proper signaling.

Paper R4-146495, "2UL inter-band CA protection of GNSS", Qualcomm Incorporated, Jun. 10, 2014, 3GPP TSG-RAN WG4 Meeting #72bis, generically discloses, in support of GNSS receiver protection, reusing signaling schemes already introduced for interference avoidance for in-device coexistence, or introducing a new or modified signaling.

SUMMARY OF INVENTION

The Applicant has recognized that none of the cited prior arts solutions is satisfactory. Indeed, both Paper R4-145947 and Paper R4-146495 pay little attention on detailing (or at least allowing to understand) how really to take action (at both network node and user equipment sides) when Carrier Aggregation uplink data transmission generates IMD signals falling within the GNSS receiver band.

Indeed, no indication about signaling (e.g., content and transmission mode thereof), neither indications about how to use this signaling are provided in paper R4-145947.

Similarly, in paper R4-146495 no detailed signaling scheme is provided (other than examples of information that can be delivered), and no proposals of the appropriate actions to be taken by the cellular network, or by the user equipment, after receiving the signaling (other than a generic list of some examples) are provided.

In view of the above, the Applicant has tackled the problem of devising a simple and effective solution aimed at limiting radio resources allocated to a user equipment when a Carrier Aggregation uplink data transmission would result in a not-negligible interference with GNSS signals reception.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for uplink allocation of radio resources in a cellular network comprising a network node and, associated with the network node, at least one user equipment supporting data reception from a global navigation satellite system, the method comprising for each one of said at least one user equipment:

if uplink data transmission from the user equipment to the network node is based on aggregation of carriers and if data reception from the global navigation satellite system is enabled, determining a reception time interval, with respect to a framing system of the cellular network, during which data reception from the global navigation satellite system takes place, said determining being based on timing information concerning data reception by the user equipment from the global navigation satellite system, and if uplink data transmission potentially takes place at least partially within said reception time interval, limiting allocation of radio resources for said uplink data transmission from the user equipment.

According to an embodiment of the present invention, said timing information comprises:

a parameter indicative of a reference frame of said frame system wherein data reception from the global navigation satellite system takes place, a parameter indicative of a data reception start within the reference frame, e.g. in terms of sub-frames, and a parameter indicative of a data reception duration, e.g. in terms of sub-frames.

According to an embodiment of the present invention, said timing information further comprises a parameter indicative of a data reception period, e.g. in terms of frames.

According to an embodiment of the present invention, the method is iterated at each transmission time interval, said limiting allocation of radio resources comprising not allocating during the current transmission time interval radio resources for uplink data transmission from the user equipment.

According to an embodiment of the present invention, said limiting allocation of radio resources comprises allocating radio resources for uplink data transmission from the user equipment on a part of said carriers.

According to an embodiment of the present invention, the method further comprises determining a set of forbidden radio resources for which uplink data transmission potentially interferes with said data reception from the global navigation satellite system, and said limiting allocation of radio resources comprises allocating, for the user equipment, radio resources not comprising said set of forbidden radio resources, or allocating, for the user equipment, radio resources comprising also a subset of said set of forbidden radio resources.

According to an embodiment of the present invention, said allocating, for the user equipment, radio resources comprising also a subset of said set of forbidden radio resources is carried out if, for at least one carrier, an estimated transmission power per radio resource associated with the user equipment is below a maximum allowable transmission power per radio resource associated with the user equipment. Said maximum allowable transmission power per radio resource is indicative of an impact of intermodulation components of said uplink data transmission from the user equipment on said data reception from the global navigation satellite system.

According to an embodiment of the present invention, said allocating, for the user equipment, radio resources comprising a subset of said set of forbidden radio resources comprises increasing the number of radio resources allocated for that user equipment if, for at least one carrier, an estimated transmission power per radio resource associated with the user equipment is above a maximum allowable transmission power per radio resource associated with the user equipment and said estimated transmission power per radio resource associated with the user equipment is close to said maximum allowable transmission power per radio resource associated with the user equipment.

According to an embodiment of the present invention, said allocating, for the user equipment, radio resources comprising a subset of said set of forbidden radio resources comprises decreasing the transmission power of the user equipment according to uplink power control commands sent to the user equipment and/or to "Modulation and Coding Scheme" selected for said uplink data transmission.

According to an embodiment of the present invention, said estimated transmission power per radio resource associated with the user equipment is based on "Power Headroom Report" by the user equipment.

According to an embodiment of the present invention, at least one among said parameter indicative of a reference frame of said frame system wherein data reception from the global navigation satellite system takes place, said parameter indicative of a data reception start within the reference frame, said parameter indicative of a data reception duration, and said parameter indicative of a data reception period are transmitted over "Radio Resource Control" messages from the user equipment to the network node.

According to an embodiment of the present invention, the method further comprises, if said set of forbidden radio resources comprise radio resources dedicated to "Physical Uplink Control CHannel" transmission:

decreasing the transmission power of the user equipment according to uplink power control commands sent to the user equipment and/or to "Modulation and Coding Scheme" selected for said uplink data transmission; or configuring or reconfiguring at least one portion of user equipment feedbacks information; or forcing user equipment feedback information from the user equipment to be sent on only one carrier.

According to an embodiment of the present invention, said determining forbidden radio resources is carried out according to harmonic frequencies of the carriers frequencies as well as at sum and difference frequencies of the carriers frequencies and at harmonic frequencies thereof.

According to an embodiment of the present invention, the method is run for each user equipment having priority data to be transmitted.

Another aspect of the present invention relates to a network apparatus (e.g., a network node) for use in a cellular network comprising at least one user equipment supporting data reception from a global navigation satellite system, for each one of said at least one user equipment the network apparatus being configured for:

if uplink data transmission from the user equipment to the network node is based on aggregation of carriers and if data reception from the global navigation satellite system is enabled, determining a reception time interval, with respect to a framing system of the cellular network, during which data reception from the global navigation satellite system takes place, said determining being based on timing information concerning data reception by the user equipment from the global navigation satellite system, and if uplink data transmission potentially takes place at least partially within said reception time interval, limiting allocation of radio resources for said uplink data transmission from the user equipment.

A further aspect of the present invention relates to a user equipment for use in a cellular network, the user equipment supporting data reception from a global navigation satellite system and uplink data transmission based on aggregation of carriers, as soon as data reception from the global navigation satellite system is enabled the user equipment being configured for providing to a network node of the cellular network data reception information comprising at least one among:

a parameter indicative of a reference frame of said frame system wherein data reception from the global navigation satellite system takes place, a parameter indicative of a data reception start within the reference frame, in terms of sub-frames, a parameter indicative of a data reception duration, in terms of frames, and a parameter indicative of a data reception period, in terms of frames, According to an embodiment of the present invention, the user equipment is further configured to provide to the network node of the cellular network (100) said data reception information over "Radio Resource Control" messages.

According to an embodiment of the present invention, said "Radio Resource Control" messages comprise "RRC Connection Request", or "RRC Connection Setup Complete", or "RRC Connection Reconfiguration Complete", or "Measurement Report", or "InDeviceCoexIndication" messages.

According to an embodiment of the present invention, said data reception information further comprises an indication of the type of global navigation satellite system, and an indication of enabling/disabling of data reception from the global navigation satellite system.

The present invention allows efficiently allocating radio resources in cellular network by taking into account "interference" possibly originating between Carrier Aggregation uplink data transmission and GNSS signals reception.

Moreover, the present invention allows compatibility with user equipment not supporting Carrier Aggregation, which requires no change to cellular network communication protocols or infrastructures.

Last but not least, low computational complexity required by the present invention makes it particularly adapted to be used in any cellular network, and at any proper side thereof. Indeed, the present invention may be run at any point of the cellular network providing for radio resources allocation functionalities and users requests management.

BRIEF DESCRIPTION OF THE ANNEXED DRAWINGS

Figure 2:
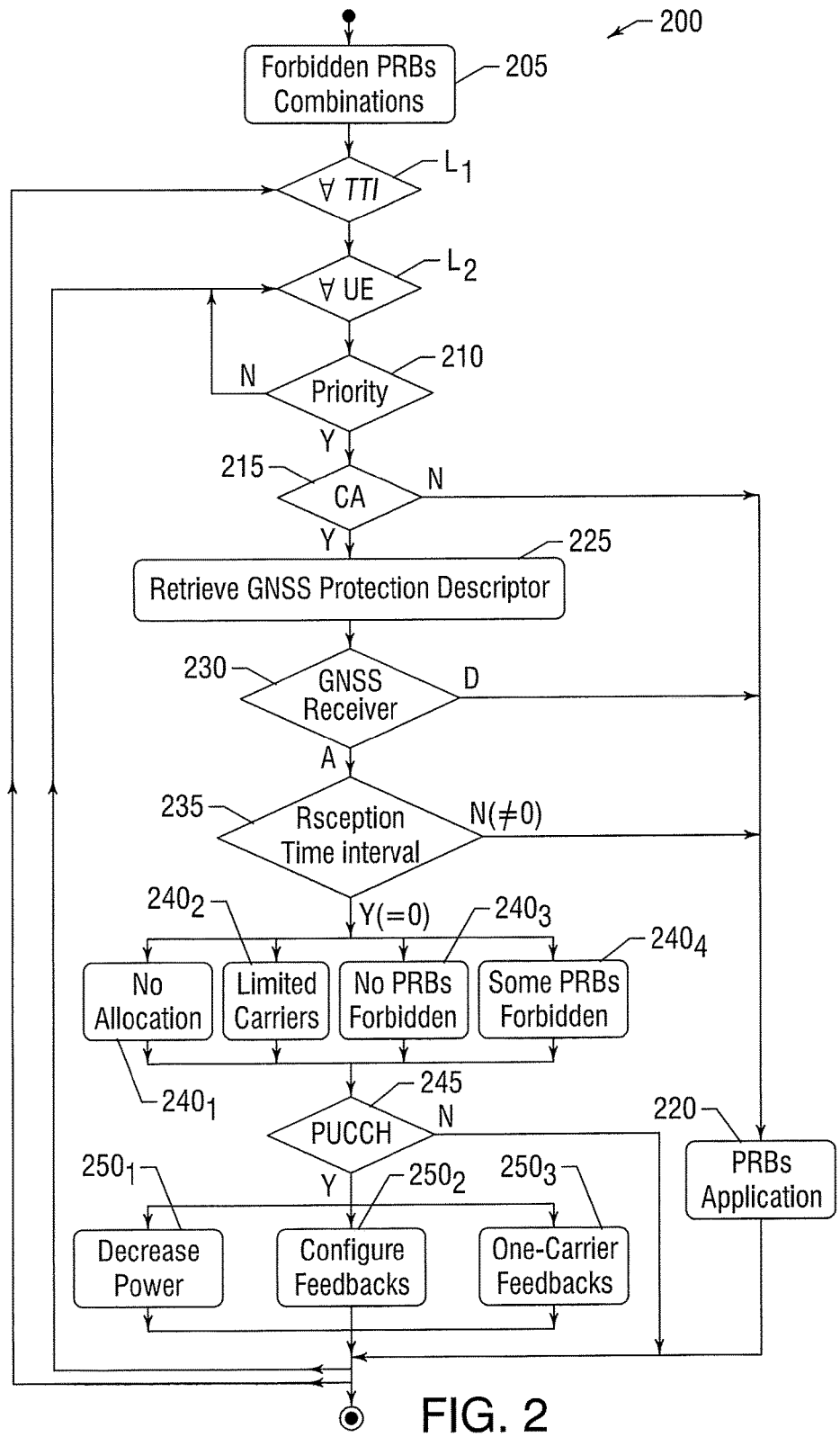

These and other features and advantages of the present invention will be made apparent by the following description of some exemplary and non limitative embodiments thereof; for its better intelligibility, the following description should be read making reference to the attached drawings, wherein:

FIG. 1 schematically shows a portion of a cellular network wherein the present invention may be applied, and FIG. 2 schematically shows an activity diagram of an allocation procedure adapted to be used in the cellular network, according to an embodiment of the present invention.

DETAILED DESCRIPTION OF PREFERRED EMBODIMENTS OF THE INVENTION

With reference to the drawings, a portion of a cellular network 100 wherein the present invention may be applied is schematically shown in FIG. 1.

The cellular network 100 (e.g., compliant with the LTE/LTE-A standard) comprises a number of network nodes, such as the network node 105 (e.g. an eNodeB), allowing transmission of data (e.g., web browsing, e-mailing, voice, or multimedia data) with a number of user equipments of the cellular network 100, such as the user equipment UE.

According to LTE/LTE-A standard, transmission and user multiplexing takes place based on "Single Carrier Frequency Division Multiple Access" (SC-FDMA) in uplink and OFDMA ("Orthogonal Frequency-Division Multiplexing Access") in downlink. According to both SC-FDMA and OFDMA, in time domain the radio resources are distributed every "Transmission Time Interval" (TTI), each one lasting 1 ms (sub-frame) and comprising two time slots of 0.5 ms each, whereas in frequency domain the whole bandwidth is divided into a plurality of 180-kHz sub-channels (each one corresponding to N=12 adjacent and equally spaced sub-carriers). A radio resource comprising a certain number of symbols (e.g., seven) spanning over one time slot in time domain and twelve adjacent sub-carriers in frequency domain is referred to as "Physical Resource Block" (PRB), and corresponds to the smallest radio resource that can be allocated to a user equipment UE for transmission.

Hereinafter, for the purposes of the present invention, uplink data transmission (i.e., from the user equipment UE to the network node 105) based on aggregation of carriers, for example Carrier Aggregation—hereinafter, Carrier Aggregation uplink data transmission—and a user equipment UE embedding a receiver operable in association with a GNSS ("Global Navigation Satellite System") system (hereinafter, GNSS receiver) will be considered only, which the present invention is mainly addressed to.

The GNSS receiver, not shown, is configured to receive signals (hereinafter, GNSS signals) from satellites of the GNSS system, such as the satellite 110, and to determine accurate current position (e.g., longitude, latitude, and altitude) of the user equipment UE—e.g., when applications or programs resident in the user equipment UE require it in order to provide a service—according to data (GNSS data) contained in the GNSS signals. Without losing of generality, the GNSS system may be any satellites system providing autonomous geo-spatial positioning with global coverage (e.g., "Global Positioning System" (GPS), "GLObal NAvigation Satellite System" (GLONASS), Compass, and Galileo).

For the sake of completeness, as well known by those having ordinary skill in the art, the network nodes, such as the network node 105, form the radio access network. In turn, the radio access network is generally communicably coupled with one or more core networks (such as the core network CN), which may be coupled with other networks, such as the Internet and/or public switched telephone networks (not illustrated). Preferably, as envisioned by operators and cellular network manufacturers as a result of new, complex tasks and ever increasing amount of data flows that the cellular network is expected to handle, coupling between the radio access network and the core network CN is achieved by means of optical fiber connectivity OF, although this should not be construed limitatively.

Although not shown, a scheduling unit (or scheduler) is provided, e.g. in the network node 105, for scheduling radio resources allocation.

As discussed in the introductory part of the present description, degradation in reception of the GNSS signals may be experienced by the GNSS receiver of the user equipment UE when Carrier Aggregation uplink data transmission takes place, due to undesired intermodulation components (resulting from said aggregation of carriers) falling within the GNSS receiver band.

In order to avoid that, according to the present invention the scheduler is configured to carry out an allocation procedure (discussed herebelow) for limiting radio resources allocation to a user equipment UE when interference between GNSS signals reception and Carrier Aggregation uplink data transmission arises, thereby allowing to prevent or resolve possible degradation of GNSS signals reception. Broadly speaking, according to the allocation procedure, if uplink data transmission from the user equipment UE to the network node 105 is based on aggregation of carriers and if GNSS signal reception is enabled (i.e., GNSS receiver activated), a reception time interval (with respect to a frame system of the cellular network 100) during which GNSS signals reception takes place is determined, and if, based on a provisional radio resource allocation, Carrier Aggregation uplink data transmission potentially takes place at least partially within said reception time interval, allocation of radio resources for Carrier Aggregation uplink data transmission from the user equipment UE is limited with respect to said provisional allocation.

Preferably, in order to determine said reception time interval, the user equipment UE is configured to transmit (to the network node 105) information about the GNSS system (hereinafter, GNSS system information) as well as GNSS receiver timing information (hereinafter, GNSS timing information) allowing determining said reception time interval, and the network node 105 (e.g., the scheduler thereof), upon reception of said information, is configured to carry out the allocation procedure.

Preferably, although not necessarily, the GNSS system information are provided via a number type, each GNSS system (e.g., GPS, GLONASS, Compass, and Galileo)

being for example associated with a respective (univocal) number value. In order to take into account the practical case wherein the GNSS receiver is activated or deactivated (and the GNSS data/signals reception enabled or disabled, respectively) during connection between the user equipment UE and the network node 105, a control type may be advantageously added to the GNSS system information to inform the network node 105 about GNSS receiver activation or deactivation, respectively, so that limited allocation of PRBs to the user equipment UE (as "interference" between the GNSS signal and the Carrier Aggregation uplink data transmission may occur) or usual allocation of PRBs (as no "interference" between the GNSS signal and the Carrier Aggregation uplink data transmission occurs) may take place.

As mentioned above, the reception time interval provides an indication about time reference of GNSS receiver reception window compared to the LTE framing structure/system (e.g., according the LTE "System Frame Number" (or SFN)), whereby the cellular network 100 is aware of the time instants/intervals the user equipment UE (i.e., the GNSS receiver thereof) should receive the GNSS signals and may take this information into account (in order to limit PRBs allocation, as detailed below). According to a preferred embodiment of the present invention, the GNSS timing information comprises:
  a parameter $GNSS_{RF}$ indicative of a reference frame of said frame system (e.g., based on "System Frame Number") wherein GNSS signals reception takes place;
  a parameter $GNSS_S$ indicative of a data reception start within the reference frame, e.g. in terms of sub-frames;
  a parameter $GNSS_D$ indicative of a data reception duration, e.g. in terms sub-frames;
  a parameter $GNSS_P$ indicative of a data reception period, e.g. in terms of sub-frames.

According to alternative embodiments of the present invention, only a subset of the above information/parameters may be considered (indeed, the parameter $GNSS_P$ may also not be provided at all, e.g. as being implicitly determined by actual periodicity of reception of the parameters $GNSS_{RF}$, $GNSS_S$, $GNSS_D$ or as non periodic reception of the parameters $GNSS_{RF}$, $GNSS_S$, $GNSS_D$ may be considered), or other information/parameters may be derived therefrom. In addition, if the cellular network 100 (e.g., the network node 105) is provided with a GNSS receiver compatible to the GNSS system communicated by the GNSS system information, or is able to acquire the GNSS timing information from other sources, the parameter $GNSS_{RF}$, and/or the parameter $GNSS_S$, and/or the parameter $GNSS_D$ and/or the parameter $GNSS_P$ may be directly derived from the cellular network 100 (instead of being received by the user equipment UE).

In addition to the GNSS system information and to the GNSS timing information, the user equipment UE may also transmit to the network node 105 power information comprising a maximum allowable transmission power (associated with, i.e. of, the user equipment UE) per PRB on the carriers—as better discussed in the following, transmission of the power information may take place or not according to a current connection status/configuration of the cellular network 100 and/or of the user equipment UE. Assuming, for the sake of ease, a two-carriers Carrier Aggregation uplink data transmission (i.e. wherein only two carriers are aggregated, namely a lower-frequency carrier and a higher-frequency carrier), said power information represents the maximum allowable transmission power per PRB on the lower-frequency carrier that, in combination with the maximum allowable transmission power per each PRB on the higher-frequency carrier, results in IMD signals with negligible impact on GNSS signals reception (e.g., maximum allowable transmission power per PRB on the lower-frequency and higher-frequency carriers between −40 dBm and 23 dBm). However, as should be readily understood, in the case of three (or more)-carriers Carrier Aggregation uplink data transmission (indeed, in current LTE/LTE-A specifications up to five carriers may be aggregated in uplink) the power information comprising the maximum allowable transmission power per PRB on the carriers are transmitted by the user equipment UE to the network node 105 for each carrier.

From the practical standpoint, the GNSS system information, the GNSS timing information (when provided) and the power information (when provided) are preferably entered into respective (one or more) fields (e.g., vectors) of a GNSS protection information descriptor (or, shortly, GNSS protection descriptor).

An example of GNSS protection descriptor may be the following:
  GNSS_system→ENUMERATED {GPS, GLONASS, Galileo, OFF},
  $GNSS_{RF}$→INTEGER (0 . . . 1023),
  $GNSS_S$→INTEGER (0 . . . 9),
  $GNSS_P$→INTEGER (0 . . . 4095),
  $GNSS_D$→INTEGER (0 . . . 4095),
  PowerLowCarrier→INTEGER (−40 . . . 23)
  PowerHighCarrier→INTEGER (−40 . . . 23)

In its turn, the GNSS protection descriptor is preferably added (e.g., incorporated or annexed) to suitable messages among those already provided by the LTE/LTE-A standard, with the content of the GNSS protection descriptor (e.g., provision or not of the power information) and LTE/LTE-A standard messages the GNSS protection descriptor is added to that preferably takes place according to (at least part of) the following cellular network 100/user equipment UE connection status/configuration scenarios:
  in case that, upon connection between the user equipment UE and the network node 100, the GNSS receiver of the user equipment UE is not active, no GNSS protection descriptor is added to the LTE/LTE-A standard messages.
  in case that, upon connection between the user equipment UE and the network node 100, the GNSS receiver of the user equipment UE had already been activated (e.g., on request by a user, or autonomously by the user equipment UE), the GNSS protection descriptor is added to ("Radio Resource Control") RRC messages sent from the user equipment UE to the network node 105 during "RRC Connection Setup" procedure. For example, the GNSS protection descriptor may be added to the "RRC Connection Request" message (so as to be taken into account by the network node 105 yet during the first PRB configuration to the user equipment UE), advantageously without said power information (indeed, during "RRC Connection Setup" procedure no aggregation of carriers has been determined), or to the "RRC Connection Setup Complete" messge, or to the "RRC Connection Reconfiguration Complete" message;
  in case the GNSS receiver is activated once the connection between the user equipment UE and the network node 100 is already active (which is determined from the control type added to the GNSS system information), the GNSS protection descriptor may be added to the RRC messages sent from the user equipment UE to the network node 105 during "RRC Connection". For example, the GNSS protection descriptor may be added to the "Measurement Report" message, or to "RRC Connection Reconfiguration Complete", or to the "InDeviceCoexIndication" message. Similarly, in case the GNSS receiver, previously activated, is deactivated once the connection between the user equipment UE and the network node 100 is already active (in which case the control type added to the GNSS system information should take a corresponding value and, preferably, the GNSS timing information and the power information are set to zero).

Anyway, nothing prevents from providing the GNSS protection descriptor (or at least a part thereof) by means of dedicated RRC messages (e.g., not presently foreseen by the LTE/LTE/A standard). For example, in case the GNSS receiver, previously deactivated/activated, is activated/deactivated once the connection between the user equipment UE and the network node 100 is already active, (only) the control type (or other similar dedicated activation/deactivation information) may be added to known RRC message (such as the RRC messages mentioned above) or to any dedicated RRC message.

As mentioned above, if the network node 105 does not receive any GNSS protection descriptor, it meaning that the user equipment UE is not provided with GNSS receiver or that the GNSS receiver is not active, uplink transmission radio resource blocks scheduling may take place as usual. If, and when, the network node 105 instead receives the GNSS protection descriptor, an uplink transmission radio resource blocks scheduling able to prevent possible degradation of GNSS signals reception takes place.

FIG. 2 shows an activity diagram illustrating the operations flow of an allocation procedure 200 according to an embodiment of the present invention. Without losing of generality, the allocation procedure 200 may take place at corresponding (preexisting or new) modules of (i.e., within or associated with) the network node 105—the use of the term "module" being herein intended to emphasize functional (rather than implementation) aspects thereof, as each module may be implemented by software, hardware, and/or a combination thereof and may have distributed, rather than centralized, nature. For example, as herein assumed, the allocation procedure 200 takes place at network node 105 scheduler.

The allocation procedure 200 preferably starts by computing, for each (actual) user equipment UE of the cellular network 100 that supports Carrier Aggregation uplink data transmission, a set of PRBs (combinations) on each carrier (i.e., the lower-frequency and higher-frequency carriers in the exemplary considered scenario of two-carriers) that may cause interference to the GNSS receiver (hereinafter referred to as forbidden PRBs or forbidden PRBs combinations)—action block 205. Advantageously, this is achieved by means of the well known formula used to compute IMD signals (e.g., intermodulation components resulting from the Carrier Aggregation uplink data transmission), namely:

$$n*f_1 +/- m*f_2$$

wherein $f_1$ and $f_2$ represent the frequencies of the lower-frequency and higher-frequency carriers, respectively, and $n*f_1$ and $m*f_2$ represent the harmonic frequencies thereof (i.e., at integer multiples n and m, respectively)—indeed, as known, the IMD signals comprise signals at harmonic frequencies of the carriers frequencies, and signals at the sum and difference frequencies of the carriers frequencies and at harmonic frequencies thereof.

According to an alternative embodiment of the present invention, the forbidden PRBs combinations are computed (offline) based on all Carrier Aggregation uplink data transmission combinations and on all GNSS systems supported by the network node 105.

Preferably, the forbidden PRBs combinations are stored in a database (not shown) accessible to the network node 105 when the allocation procedure 200 so requires (as detailed herebelow).

Then, the allocation procedure 200 goes on by iterating the following steps for each TTI (as conceptually illustrated in the figure by loop control $L_1$) and for each user equipment UE served by the network node 105 (as conceptually illustrated in the figure by loop control $L_2$).

The allocation procedure 200 first checks (decision block 210) whether priority data associated with the user equipment UE under evaluation exist—the priority data comprising, for example, data needing prompt (uplink) PRBs allocation in order to meet waiting times requirements. In the negative case (exit branch N of the decision block 210), another user equipment UE is evaluated, whereas in the affirmative case (exit branch Y of the decision block 210), another check is performed at decision block 215 aimed at evaluating whether the user equipment UE supports Carrier Aggregation.

If the user equipment UE does not support Carrier Aggregation (exit branch N of the decision block 215 or only one (uplink) carrier is configured, uplink PRBs scheduling (action block 220) takes place as usual—i.e. without PRBs allocation limitation, as interference between Carrier Aggregation uplink data transmission and GNSS signals can not arise. Otherwise (exit branch Y of the decision block 215), it meaning that the user equipment UE does support Carrier Aggregation and more than one (uplink) carrier are configured, and hence that interference between Carrier Aggregation uplink data transmission and GNSS signals may arise, the GNSS protection descriptor associated with the user equipment UE is retrieved (action block 225), is provided, and the related information are checked in order to evaluate an activated/deactivated state of the GNSS receiver of the user equipment UE (decision block 230).

If (exit branch D of the decision block 230) the GNSS receiver of the user equipment UE is in the deactivated state (i.e. no GNSS protection descriptor has been received or the control type of the GNSS protection descriptor so indicates), uplink PRBs scheduling takes place as usual (action block 220) as no interference between Carrier Aggregation uplink data transmission and GNSS signals may arise. If instead the GNSS receiver of the user equipment UE is in the activated state (exit branch A of the decision block 230), the allocation procedure 200 determines said reception time interval during which the GNSS signals are expected, thereafter, a check (decision block 235) is performed for evaluating whether Carrier Aggregation uplink data transmission potentially takes place at least partially within said reception time interval.

In other words, at the decision block 235, the allocation procedure 200 compares the transmission time of potentially scheduled PRBs and the reception time of the GNSS signals at the GNSS receiver of the user equipment UE to each other—so that uplink PRBs scheduling may take place as usual when no interference between uplink Carrier Aggregation transmission and GNSS signals may arise due to asynchrony therebetween or a limitation, with respect to said provisional allocation, of PRBs allocation for the uplink data transmission from the user equipment (UE) is carried out when interference between uplink Carrier Aggregation transmission and
GNSS signals arises.
Denoting by:
$GNSS_{RF}$, $GNSS_S$, $GNSS_D$ and $GNSS_P$ the values of the parameters $GNSS_{RF}$, $GNSS_S$, $GNSS_D$ and $GNSS_P$, respectively;
$GNSS_D$ a variable being swept from 0 to $GNSS_D$;
$SFN_{curr}$ the current SFN;
$SFN_{cycles}$ the number of entire SFN cycles; and by
$N_{SF,curr}$ the current sub-frame number,
the allocation procedure 200 preferably operates at decision block 235 as follows. If:

$$[(SFN_{curr} - GNSS_{RF} + 1024 * SFN_{cycles}) * 10 + (N_{SF,curr} - GNSS_S + GNSS_D + 4)] \bmod GNSS_P \neq 0$$

for any of swept values of the variable $GNSS_D$, exit branch Y of the decision block 235, uplink PRBs scheduling takes place as usual (action block 220) as no interference between Carrier Aggregation uplink data transmission and GNSS signals may arise.

In the formula above (which should be understood as illustrative and not restrictive), "10" represents the number of sub-frames per frame, "4" represents the number of sub-frames that occur between the scheduling decision and the actual transmission in uplink by the user equipment UE, and the number of entire SFN cycles $SFN_{cycles}$ takes into account that in LTE/LTE-A standard the SFN is cyclically repeated from 0 to 1023 and that there could be the case that the current SFN $SFN_{curr}$ is related to a different cycle with respect to the reference SFN indicated by the paramter $GNSS_{RF}$—so that the network node 105 takes into account also the entire SFN cycles occurred since the reception of the GNSS protection descriptor from the user equipment UE and the current moment.

Back to the activity diagram, if instead $$[(SFN_{curr} - GNSS_{RF} + 1024 * SFN_{cycles}) * 10 + (N_{SF,curr} - GNSS_S + GNSS_D + 4)] \bmod GNSS_P = 0$$

for at least one of the swept values of the variable $GNSS_D$, exit branch N of the decision block 235, the PRBs allocation limitation is carried out.

By way of example only, the following actions (alternative to each other) for providing said PRBs allocation limitation may be taken:
the user equipment UE is not scheduled during these TTI of the current allocation procedure 200 (i.e., no allocation of PRBs to the user equipment UE is carried out) and other user equipments UE are instead scheduled (e.g., according to scheduling policies internal to the network node 105)—action block $240_1$; or
the user equipment UE is scheduled ((.e., allocation of PRBs to the user equipment UE is carried out) only on one of the two uplink carriers—action block $240_2$; or
the network node 105 schedules, for the for the user equipment UE, allocation of PRBs not including the forbidden PRBS—action block $240_3$; or
the network node 105 schedules, for the user equipment UE, allocation of PRBs including some (i.e., a subset) of the forbidden PRBs (combinations) set—action block $240_4$. As better discussed herebelow, this is preferably achieved according to an estimated transmission power per PRB (e.g., estimated by the network node 105 based on power control algorithms and on "Power Headroom Report" reported by the user equipment UE) and to said power information about maximum allowable transmission power per PRB on the carriers.

According to an embodiment of the present invention, allocation of PRBs including some of the forbidden PRB is carried out by the network node 105 only if the estimated transmitted power per PRB on the (two, in the considered example) uplink carriers are below the maximum allowable transmission power per PRB on the lower-frequency and higher-frequency carriers signaled by the user equipment UE in the GNSS protection descriptor.

According to another embodiment of the present invention, allocation of PRBs including some of the forbidden PRB is carried out by the network node 105 if at least one between the estimated transmitted power per PRB on the lower-frequency and higher-frequency carriers is below, respectively, the maximum allowable transmission power per PRB on the lower-frequency and higher-frequency carriers signaled by the user equipment UE in the GNSS protection descriptor. In this case, in order to not degrade GNSS signal reception, the network node 105 may:
increase the number of PRBs allocated to that user equipment UE (e.g., based on data present in the user equipment UE buffer and based on the scheduling policies at the network node 105), if the estimated transmission power per PRB is close to the maximum allowable transmission power per PRB (as the increase of allocated PRBs requires higher transmission power). In this case, as the estimated transmission power per PRB is close to its maximum allowable transmission power, the transmission power per PRB is advantageously decreased (e.g., under the control of the power control algorithm) to allow the transmission on the higher number of PRBs. This action is taken by the network node 105 if the final estimated transmission power per PRB is lower than the limits signaled by the user equipment UE for all (e.g., both) the uplink carriers. The extended PRB allocation can be done for both the uplink carriers: it is up to the scheduler to decide which carrier to be considered, taking into account the final IMD level that will fall on the GNSS reception bandwidth; or
decrease the transmission power of the user equipment UE, e.g. according to uplink power control commands sent to the user equipment UE and/or to "Modulation and Coding Scheme" (MCS) selected for the uplink transmission. Based on the uplink power control algorithm, both the MCS and the uplink power control commands impact the final transmission power value. In case of the power control commands, taking into account that the network node 105 can send both absolute (with limited dynamic) and incremental values, it can requires more successive commands to converge to the desired value, so it can require more TTIs to obtain the final desired value.

Back to the activity diagram, the allocation procedure 200 preferably goes on from the action blocks $240_1$-$240_4$ by checking whether the forbidden PRB for the user equipment UE comprises PRBs that have been dedicated to the "Physical Uplink Control CHannel" (PUCCH) transmission (and located at the uplink bandwidth edge)—decision block 245. In the affirmative case, exit branch Y of the decision block 240, advantageously the network node 105 may:
adjust the transmission power thanks to the power control commands, similarly to what has been described for PUSCH transmission—action block $250_1$; or configure or reconfigure at least one user equipment feedback information portion (e.g., by changing period and offset parameters of the user equipment feedback information in order to avoid collision with the GNSS reception window)—action block 250₂; or force the feedback from the user equipment UE to be sent on only one carrier (e.g., the network node 105 may move all the feedbacks generated by the user equipment UE on either the lower-frequency or the higher-frequency carriers)—action block 250₃.

Back to decision block 245, if the forbidden PRB for the user equipment UE do not comprise PRBs that have been dedicated to the "Physical Uplink Control CHannel" (PUCCH) transmission, exit branch N of the decision block 245, the allocation procedure 200 ends.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a cellular network based on the LTE/LTE-A standard, it should be understood that it is not in the intentions of the Applicant to be limited to the implementation of any particular wireless communication system architecture or protocol. In this respect, it is also possible to provide that, with suitable simple modifications, the proposed allocation procedure may be applied also to other cellular networks, such as the forthcoming 5G (and beyond) cellular networks.

Furthermore, although in the present description a single network node has been considered for the sake of ease, the present invention equivalently applies to the (practical) scenario wherein several (e.g., at least two) different network nodes provide (different) carriers (to be aggregated) to a same user equipment.

Moreover, although in the present description only Carrier Aggregation approach has been considered as an example of aggregation of carriers, same considerations apply when other approaches are used, such as Dual Connectivity approach—indeed, by the user equipment viewpoint, both Carrier Aggregation and Dual Connectivity approaches relates to aggregation of carriers.

The invention claimed is:

1. A method for uplink allocation of radio resources in a cellular network including a network node and, associated with the network node, at least one user equipment supporting data reception from a global navigation satellite system, the method comprising, for each one of the at least one user equipment:

if uplink data transmission from the user equipment to the network node is based on an aggregation of carriers and if data reception from the global navigation satellite system is enabled, determining a reception time interval, with respect to a framing system of the cellular network, during which data reception from the global navigation satellite system takes place, the determining being based on timing information concerning data reception by the user equipment from the global navigation satellite system; and if uplink data transmission potentially takes place at least partially within the reception time interval, limiting allocation of radio resources for the uplink data transmission from the user equipment.

2. The method according to claim 1, wherein the timing information comprises:

a parameter indicative of a reference frame of the frame system wherein data reception from the global navigation satellite system takes place;

a parameter indicative of a data reception start within the reference frame, in terms of sub-frames; and a parameter indicative of a data reception duration, in terms of sub-frames.

3. The method according to claim 2, wherein the timing information further comprises a parameter indicative of a data reception period, in terms of sub-frames.

4. The method according to claim 1, wherein the method is iterated at each transmission time interval, the limiting allocation of radio resources comprising not allocating during the current transmission time interval radio resources for uplink data transmission from the user equipment.

5. The method according to claim 1, wherein the limiting allocation of radio resources comprises allocating radio resources for uplink data transmission from the user equipment on a part of the carriers.

6. The method according to claim 1, further comprising:

determining a set of forbidden radio resources for which uplink data transmission potentially interferes with the data reception from the global navigation satellite system, wherein the limiting allocation of radio resources comprises:

allocating, for the user equipment, radio resources not comprising the set of forbidden radio resources, or allocating, for the user equipment, radio resources comprising also a subset of the set of forbidden radio resources.

7. The method according to claim 6, wherein the allocating, for the user equipment, radio resources comprising further a subset of the set of forbidden radio resources is carried out if, for at least one carrier, an estimated transmission power per radio resource associated with the user equipment is below a maximum allowable transmission power per radio resource associated with the user equipment, the maximum allowable transmission power per radio resource being indicative of an impact of intermodulation components of the uplink data transmission from the user equipment on the data reception from the global navigation satellite system.

8. The method according to claim 6, wherein the allocating, for the user equipment, radio resources comprising further a subset of the set of forbidden radio resources comprises increasing the number of radio resources allocated for that user equipment if, for at least one carrier, an estimated transmission power per radio resource associated with the user equipment is above a maximum allowable transmission power per radio resource associated with the user equipment and the estimated transmission power per radio resource associated with the user equipment is close to the maximum allowable transmission power per radio resource associated with the user equipment.

9. The method according to claim 6, wherein the allocating, for the user equipment, radio resources comprising a subset of the set of forbidden radio resources comprises decreasing transmission power of the user equipment according to uplink power control commands sent to the user equipment and/or to a modulation and coding scheme selected for the uplink data transmission.

10. The method according to claim 7, wherein the estimated transmission power per radio resource associated with the user equipment is based on a power headroom report by the user equipment.

11. The method according to claim 6, further comprising, if the set of forbidden radio resources comprise radio resources dedicated to a physical uplink control channel transmission:
   decreasing transmission power of the user equipment according to uplink power control commands sent to the user equipment and/or to a modulation and coding scheme selected for the uplink data transmission; or
   configuring or reconfiguring at least one portion of user equipment feedbacks information; or
   forcing user equipment feedback information from the user equipment to be sent on only one carrier.

12. A user equipment for use in a cellular network, the user equipment configured to:
   support data reception from a global navigation satellite system and uplink data transmission based on an aggregation of carriers; and
   provide to a network node of the cellular network, when data reception from the global navigation satellite system is enabled, data reception information comprising at least one among:
      a parameter indicative of a reference frame of a frame system in which data reception from the global navigation satellite system takes place;
      a parameter indicative of a data reception start within the reference frame;
      a parameter indicative of a data reception duration; and
      a parameter indicative of a data reception period, wherein
   an allocation of resources to the user equipment, for the uplink data transmission from the user equipment, is limited during a data reception interval that is determined by the network node based on the data reception information,
   the network node determines the reception time interval if the uplink data transmission from the user equipment to the network node is based on an aggregation of carriers and if data reception from the global navigation satellite system is enabled, and
   the network node limits allocation of allocation of radio resources for the uplink data transmission from the user equipment if uplink data transmission potentially takes place at least partially within the reception time interval.

13. The user equipment according to claim 12, wherein the user equipment is further configured to provide to the network node of the cellular network the data reception information over radio resource control messages.

14. The user equipment according to claim 13, wherein the radio resource control messages comprise a RRC connection request message, a RRC connection setup complete message, a RRC connection reconfiguration complete message, a measurement report message or a InDeviceCoexIndication message.

15. The user equipment according to claim 12, wherein the data reception information further comprises an indication of a type of global navigation satellite system, and an indication of enabling/disabling of data reception from the global navigation satellite system.

* * * * *